US007984742B2

(12) United States Patent
Shackelford

(10) Patent No.: US 7,984,742 B2
(45) Date of Patent: Jul. 26, 2011

(54) PANEL CLAMPING ASSEMBLY

(76) Inventor: Jon E. Shackelford, Chelsea, MI (US)

( * ) Notice: Subject to any disclaimer, the term of this patent is extended or adjusted under 35 U.S.C. 154(b) by 314 days.

(21) Appl. No.: 12/349,024

(22) Filed: Jan. 6, 2009

(65) Prior Publication Data

US 2009/0183839 A1 Jul. 23, 2009

Related U.S. Application Data

(60) Provisional application No. 61/022,377, filed on Jan. 21, 2008.

(51) Int. Cl.
*B32B 37/00* (2006.01)

(52) U.S. Cl. ........................................ 156/581; 156/580

(58) Field of Classification Search .................. 156/228, 156/580, 581, 583.1; 269/104, 111, 118
See application file for complete search history.

(56) References Cited

U.S. PATENT DOCUMENTS

| | | | | |
|---|---|---|---|---|
| 4,547,255 | A | 10/1985 | Yow | |
| 4,776,919 | A | 10/1988 | Troutner et al. | |
| 5,401,354 | A | 3/1995 | Colucci | |
| 5,702,561 | A | 12/1997 | Phillips | |
| 5,984,292 | A | 11/1999 | Troha | |
| 6,039,313 | A | 3/2000 | Baculy | |
| 6,779,576 | B2 | 8/2004 | Cable | |
| 7,240,712 | B2 | 7/2007 | Cable | |
| 7,299,935 | B2 | 11/2007 | Skaley | |
| 7,886,801 | B2 * | 2/2011 | Nikumb et al. | 156/581 |

FOREIGN PATENT DOCUMENTS

WO WO 90/14168 A1 11/1990

OTHER PUBLICATIONS

PLANO Vertical Glue Press Brochure, 2002 Advanced Machinery Imports, Ltd., www.advmachinery.com.
Stackable Clamping System, 2008-2009 R & R Clamp, LLC, www.rrclamp.com.

* cited by examiner

*Primary Examiner* — James Sells
(74) *Attorney, Agent, or Firm* — Dickinson Wright PLLC

(57) ABSTRACT

A panel clamping assembly (10) facilitates gluing wooden boards (12) edge-to-edge so that they will form a perfectly flat panel after the glue sets. The assembly (10) includes a plurality of vertically oriented platens (14) each having a leading edge (16). All of the leading edges (16) lie in a common vertical plane. Wooden boards (12) are gently pressed against the leading edges (16) of the platens (14) by opposing press bars (22). Press actuators (28) create compression between the press bars (22) and their opposing platens (14). Conventional bar clamps (40) are removably hooked into respective clamp saddles (54) flanking the platens (14) to provide distributed clamping pressure normal to the glue lines. The lower ends (44) of the bar clamps (40) are slidably captured in shaft guides (92). The clamp saddles (54) are mounted to an upper mounting board (86) through the convenience of a lip (82). Likewise, the lower shaft guides (92) are attached to a lower mounting board (96). The assembly (10) can be scaled for gluing large or small wooden panels, doors, frames and the like.

19 Claims, 9 Drawing Sheets

PANEL CLAMPING ASSEMBLY

CROSS REFERENCE TO RELATED APPLICATIONS

This application claims priority to U.S. Provisional patent application 61/022,377 filed on Jan. 21, 2008, the entire disclosure of which is incorporated herein by reference and relied upon.

BACKGROUND OF THE INVENTION

1. Field of the Invention

A panel clamping assembly of the type for edge gluing wooden boards, doors, frames and the like, and more particularly a panel clamping assembly that uses commercially available bar clamps.

2. Related Art

Lumber panels are used extensively in fine furniture making and cabinetry. Large wood panels are created by gluing smaller boards together edge-to-edge. During this process, adhesive is applied to the mating edges, and then the boards pressed together using clamps. Sometimes, dowel pins, biscuits, or splines are used to help align the boards and improve joint strength. Clamp pressure is maintained until the adhesive has set.

Quality edge glued panels depend on strong glue bonds, closed joints, aligned surfaces and perfectly flat, planar edges. Edge glued boards that twist, cup or rack during the gluing process result in a panel that at best is difficult to work with and at worst unsuitable for the intended application.

Gluing boards into suitable panels can be a stressful operation. Handling long boards can be awkward. Keeping the boards aligned and in place before the glue sets can be difficult. If not careful, misapplied or dripping glue can cause a sticky mess. And limited glue curing time demands swift work.

To achieve high quality finished panels, skilled woodworkers take great care during the laminating process to ensure that freshly glued boards are held flat and undisturbed while the adhesive sets, and that clamping pressures are distributed evenly across the boards. The skilled worker will also assure that the clamps apply pressure centrally through the boards so as to minimize unbalanced and torsional stresses within the wood. Alternating clamps on opposite sides of the panel and evenly spacing the clamps are two techniques used to counterbalance unwanted induced stresses.

Various commercial attempts have been proposed to assure consistently flat edge-glued panels, some aimed at the commercial furniture manufacturing industry, whereas others are suited for the small cabinet shop and home woodworking enthusiast. Perhaps the best known example of a panel laminating system directed to the small cabinet shop is sold under the trade name Plano, marketed by Advanced Machinery Imports Ltd., of Newcastle, Del. The Plano vertical glue press, as it is known, comprises two or more vertically oriented clamps which surround all four sides of a gluing panel. Each clamp includes two opposing vertical rails formed by aluminum extrusions that sandwich the boards. The vertical rails have a generally U-shaped configuration wherein the two legs at the top of the "U" engage the wooden boards directly. Thus, for each vertical rail, two legs of the U make contact with each face of the gluing panels. Upper and lower linking arms join the two vertical rails and support the wooden panel from above and below. A screw mechanism associated with the upper linking arm comprises the sole means by which pressure is applied to the gluing panels in both the horizontal and vertical directions.

While generally effective at producing consistently flat panels, there are numerous disadvantages with the Plano vertical glue press. The system is composed entirely of specially manufactured items which are expensive and beyond the means of many woodworking enthusiasts and small shops. Another disadvantage of the Plano system resides in its committed use to one specific task—edge gluing wooden boards into panels. It is not convertible to other uses and there are no components of the Plano press assembly that can be detached and used for other purposes. Furthermore, horizontal and vertical clamping pressure for each clamp assembly is provided by a single screw associated with the upper linking arm. It is very difficult for this type of arrangement to produce ideal proportions of vertical and horizontal clamping pressure. Horizontally applied pressure, i.e., pressure exerted onto the face of the boards by the U-shaped vertical rails, is a function of the amount of pressure applied by the screw wheel. In other words, horizontal force can only be increased simultaneously with increased vertical force and vice-versa. There is no mechanism by which horizontal force to keep the boards flat can be increased while vertical pressure to squeeze the board edges together remains constant, nor by which different proportions of horizontal and vertical pressure can be applied to the boards. Thus, in situations where proportionally more pressure is required horizontally than vertically, the Plano system cannot accommodate. Yet another shortcoming of the Plano vertical glue press resides in the U-shaped configuration of the vertical rails. Because the rails are relatively wide, they cover relatively large areas of the wood during the clamping operation. When glue squeezes out from the edges during glue-up, the regions of wood covered by the rails, i.e., inside the "U," are inaccessible and therefore not all of the glue squeezed from the joints can be cleaned before it sets. Also, the wide vertical rails disadvantageously dissipate the horizontal clamping force over a relatively large area. The wide distribution of force is more likely to compel excessive tightening of the clamping screws in order to achieve the needed horizontal clamping forces. Keeping in mind that horizontal clamping pressure increases as a function of vertical pressure, excessively tightened clamping screws can lead to overcompression in the vertical direction, resulting in excessive glue squeeze out from the joints, too much induced stress in the boards, and a weaker finished panel.

Another example of a vertical panel clamping and assembly rack for small production shops can be found in U.S. Pat. No. 5,702,561 to Phillips, issued Dec. 30, 1997. Phillips discloses an apparatus and method for edge gluing wooden boards wherein the boards are supported on a lower spacer bar and stacked against a series of co-planar center support channels. Outer press bars are carried on cantilevered threaded bolts and screwed, with the aid of nuts, against the wooden boards to press them against the center support channels. Conventional bar clamps are then used to provide pressure while the adhesive sets. Numerous disadvantages are evident from the Phillips system. Firstly, the center support channels and press bars have wide flat contact surfaces, resulting in a large surface area of the wooden panels covered during the gluing operation. This frustrates glue clean-up, disadvantageously dissipates clamping force, and can result in staining of the wood, as well as uneven drying of the glued joints. Also, there is no provision for supporting the bar clamps directly from the assembly rack.

Some commercially available systems are suited only for large scale production. These systems employ various techniques to assure consistently flat panels. Examples of commercial grade systems may be found in U.S. Pat. No. 4,547,255 to Yow, issued Oct. 15, 1985, and in U.S. Pat. No. 6,779,576 to Cable, issued Aug. 24, 2004. Both of these systems describe highly automated pieces of capitol equipment for producing consistently flat edge glued panels from wooden boards. Their designs are beyond the reach of all but large-scale production furniture makers and material suppliers. As a result, they do not employ techniques or devices which are common to home woodworkers and small shop environments. Furthermore, they represent single use, dedicated machines whose components are not suitable for alternative uses.

Accordingly, there is a need for an improved panel clamping assembly of the type for edge-gluing wooden boards, doors and frames that is suitable for use in small cabinet shop and home woodworking environments. Furthermore, there is a need for a panel clamping assembly that uses commercially available, conventional bar clamps, that is convenient to use, and which permits the bar clamps to be readily removed from the clamping assembly for use in other applications.

SUMMARY OF THE INVENTION

The subject invention comprises a panel clamping assembly of the type for edge-gluing wooden boards, doors, frames and the like to assure a resulting panel door or frame that is not cupped or warped. The assembly comprises at least one pair of platens spaced apart from one another and each having a leading edge. The leading edges of the platens lie in a common plane. A press bar is associated with each platen and is movable toward and away therefrom. Each press bar includes a leading edge that is parallel to and opposing the leading edge of the associated platen for creating an elongated compression nip region therebetween. A bar clamp is disposed alongside the platens. The bar clamp has an elongated shaft extending between upper and lower ends thereof. A head stock of the bar clamp is affixed to the upper end of the shaft, whereas a tail stock is slidably disposed along the shaft relative to the head stock. A clamp saddle is configured to removably receive the head stock of the bar clamp.

The panel clamping assembly of this invention is particularly well-suited for use in small cabinet shops and home enthusiast environments wherein a conventional bar clamp located alongside the platens can be removably hung in the clamp saddle for use in the panel clamping assembly, but removed therefrom for use in other applications. Thus, the bar clamp component of the panel clamping assembly is not a dedicated component, but rather can be used for other woodworking and cabinet making applications as needed. When finished, the bar clamp(s) are returned to the clamp saddle for storage, ready for the next use in edge gluing wooden boards.

According to another aspect of this invention, the panel clamping assembly includes a press actuator operatively associated with each press bar for incrementally forcibly advancing the press bar toward its opposing platen to hold wooden boards flat against the leading edge of the platen. The clamp saddle includes at least one anti-rotation member for preventing rotation of the bar clamp while permitting guided vertical displacement of the bar clamp relative to the clamp saddle. A shaft guide is provided below the clamp saddle and fixed relative thereto. The shaft guide slidably supports the lower end of the bar clamp shaft while permitting guided vertical displacement of the bar clamp. Thus, the bar clamp can shift vertically as needed while still being supported within the clamp saddle and prevented from rotating to facilitate one-handed operation of the bar clamps during the glue-up procedure.

According to yet another aspect of this invention, a clamp saddle is provided for a panel clamping assembly of the type for edge-gluing wooden boards. The clamp saddle comprises a backboard having a front surface and a rear surface. A hook extends from the front surface of the backboard and is configured to removably support the head stock of a bar clamp. At least one anti-rotation member is adapted to prevent rotation of a bar clamp supported by the hook while providing guided vertical displacement of the bar clamp relative to the backboard. According to this aspect of the invention, the clamp saddle can be manufactured as a component useful in creating a panel clamping assembly.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
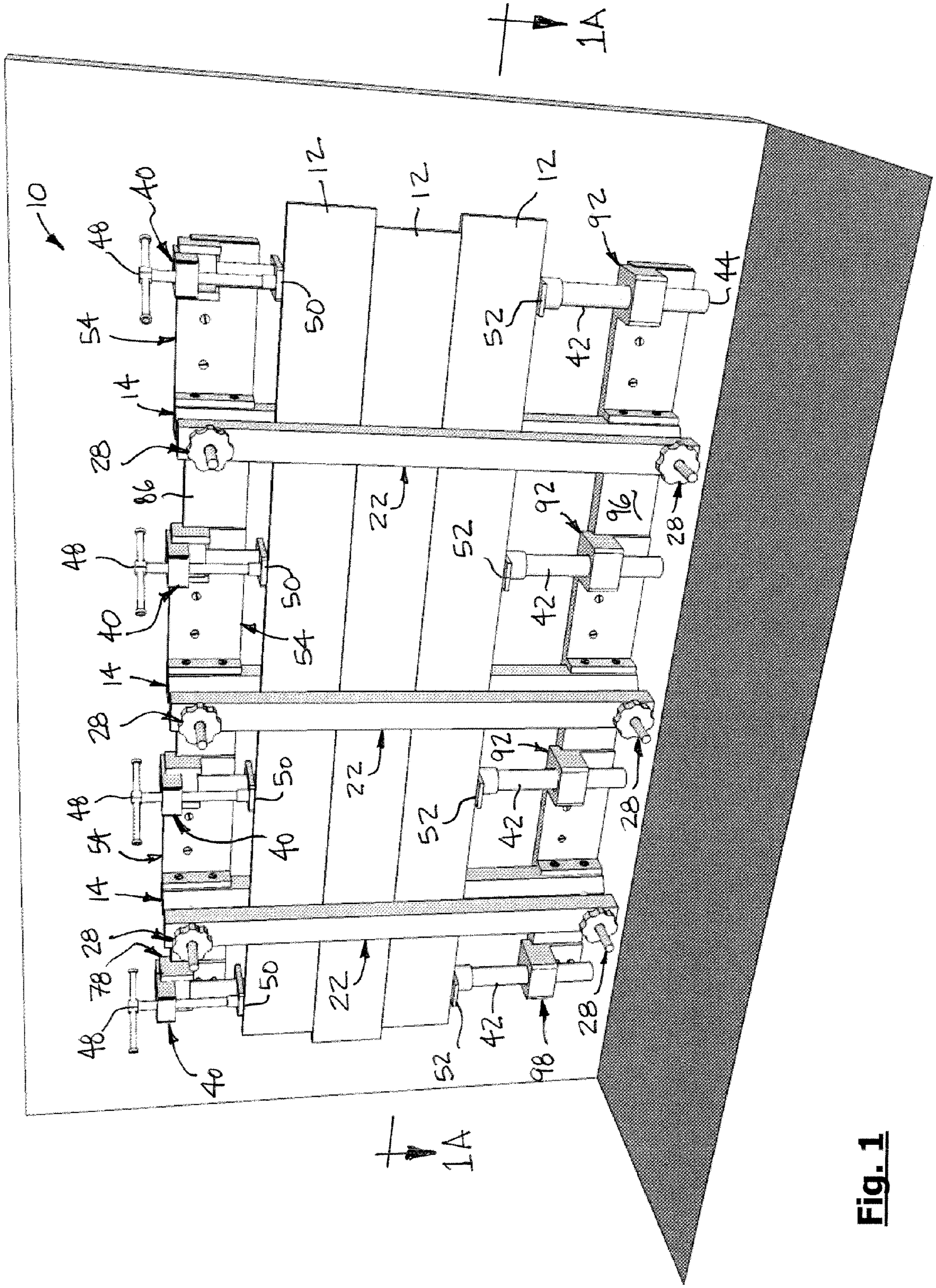
FIG. 1 is a perspective view showing a panel clamping assembly according to this invention loaded with three wooden boards being glued together to form a large wooden panel.
Figure 2:
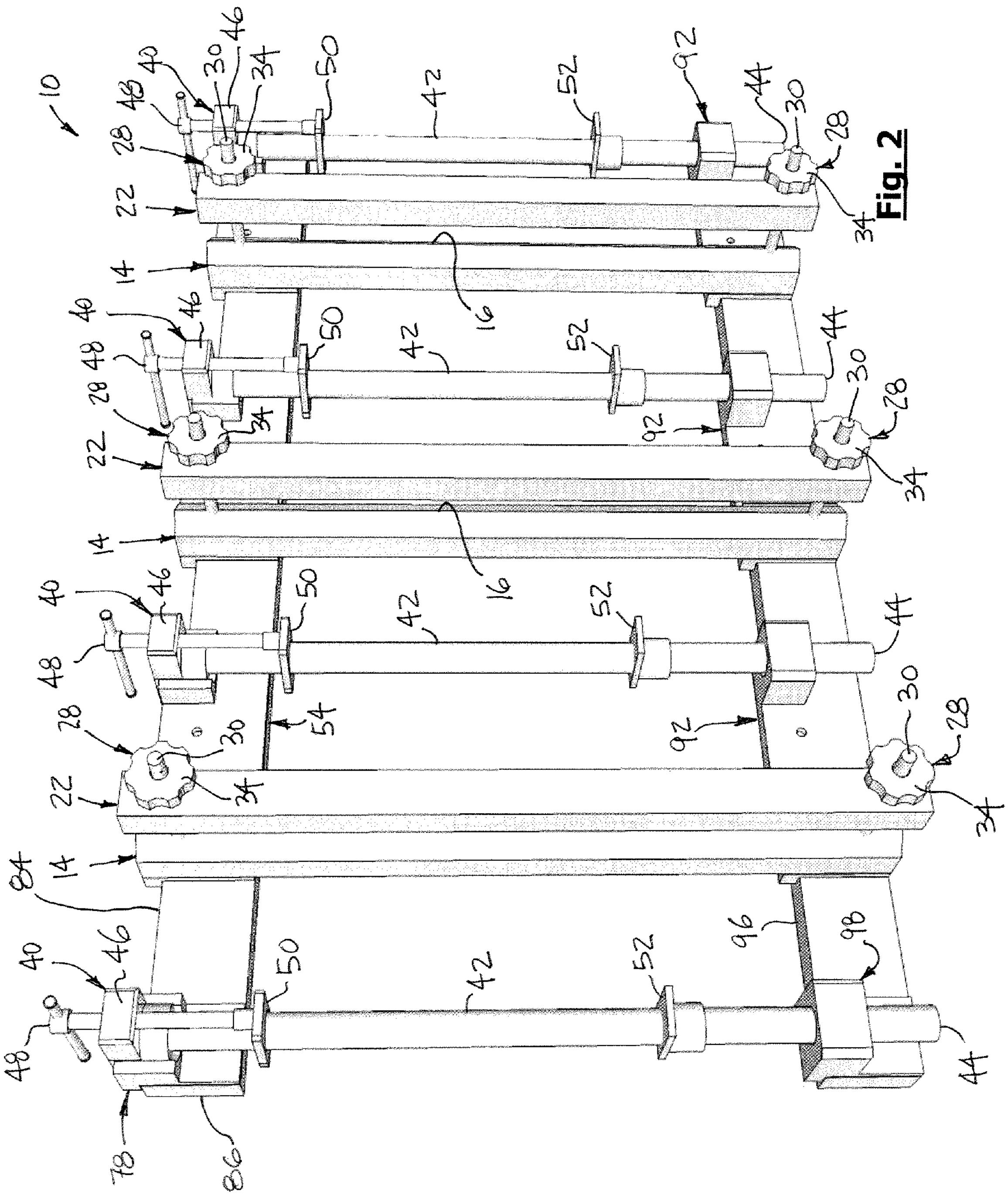
FIG. 2 is a perspective view of the panel clamping assembly.
Figure 3:
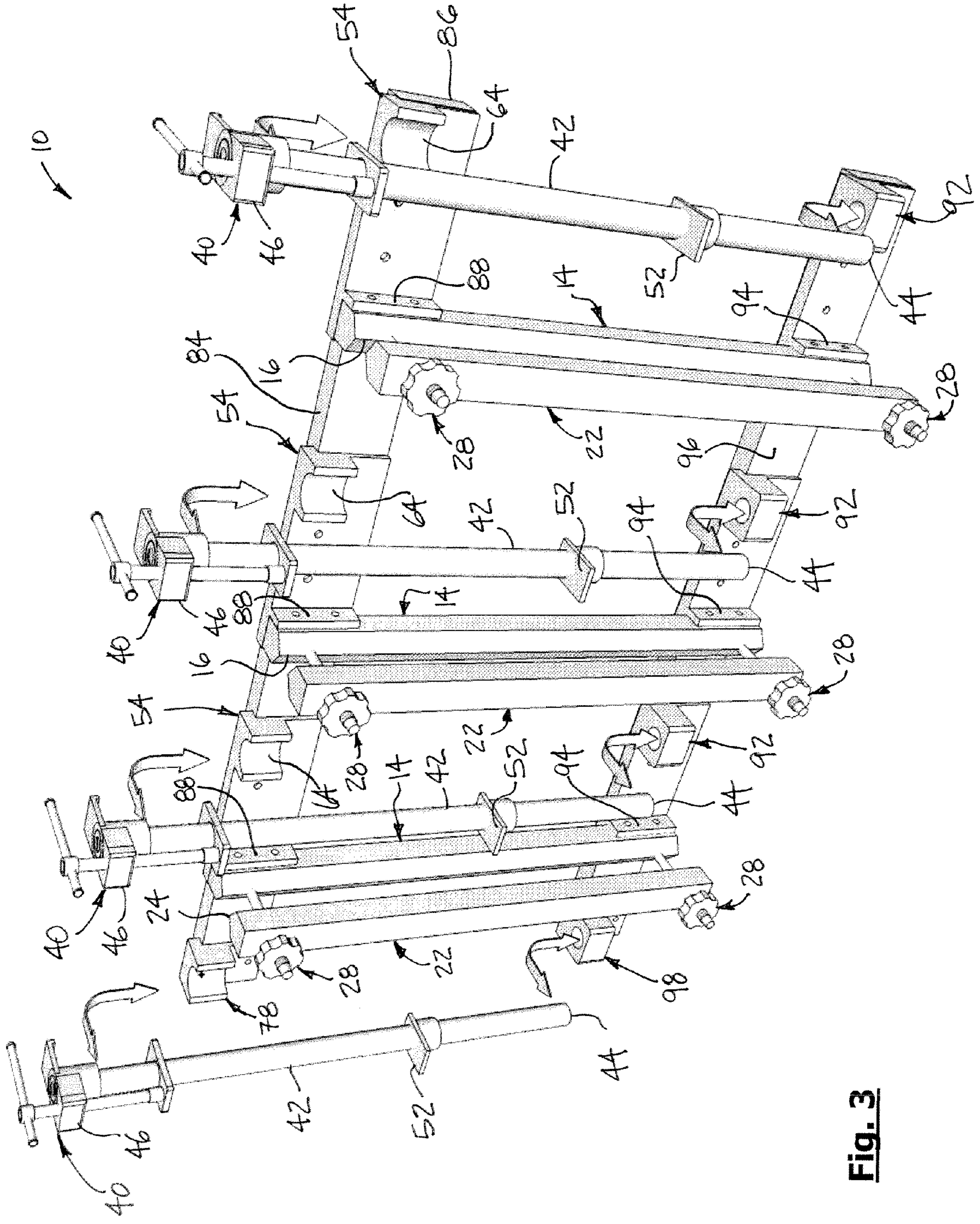
FIG. 3 is a perspective view of the panel clamping assembly, showing four bar clamps lifted out of their respective clamp saddles.

Referring to the Figures, wherein like numerals indicate like or corresponding parts throughout the several views, a panel clamping assembly according to the subject invention is generally shown at 10 in FIGS. 1-3. The assembly 10 is of the type for holding wooden boards 12 in edge-to-edge abutting relation and in a perfectly planar orientation while glue cures between the abutting surfaces. The assembly 10 can be used without alteration to glue-up doors, frames and the like. Once the adhesive has properly set, the wooden boards 12 are removed from the assembly 10 and remain in a rigid, flat condition for subsequent treatment in a woodworking operation. In the preferred embodiment of this invention, the boards 12 are held in a vertical orientation during glue-up. However, those of skill will appreciate that the assembly 10 could be angled so that the panel is assembled horizontally or at a slanted angle.

The boards 12 are held in their flat, planar orientation by pressing them against at least two platens, each generally indicated at 14. (FIGS. 1-3 illustrate an assembly 10 using three platens 14.) Each platen 14 is formed as a rigid, elongated member mounted in preferably a generally vertical orientation. The platens 14 may take any number of geometric forms, but in the example best illustrated in FIG. 5 have a 5-sided configuration when viewed in cross-section. The platens 14 are characterized by a leading edge 16 that, in the preferred embodiment, is oriented vertically. The leading edge 16 establishes line contact with the boards 12, thereby concentrating pressure. Also, the sharply peaked leading edge 16 in the preferred configuration allows maximum air circulation to facilitate glue curing, as well as maximum access to the boards 12 for cleaning glue squeeze-out and drips. In one example of the invention, the leading edge 16 is formed by an V-shaped cover 18 made of aluminum, rigid plastic, dense rubber or other suitable material which is non-reactive with the typical woodworking adhesives and does not tend to impart stains to wooden boards 12. A cover 18 made from sufficiently dense rubber would not mar the surfaces of the boards 12. The cover 18 can be fastened to the base material of the platen 14 by screws 20, adhesive, and/or other suitable fixation techniques. The base material of platens 14 can be made from wood, plastic, metal or any suitable, rigid and structurally firm material that will not deflect appreciably under loads encountered during normal operation. In one example of the invention, the base material of the platens 14 are made from laminated plywood having layers oriented normal to the board faces to provide maximum rigidity.

When arranged in the clamping assembly 10, the leading edges 16 of all of the platens 14 lie in a common plane. The leading edges of the platens 14 form the reference surfaces against which the gluing boards 12 are pressed and held to achieve a high-quality finished wooden panel. Although the example of FIGS. 1-3 depict three platens 14 arranged generally equidistant from each other, as few as two platens 14 can be used for small projects or more than three for large panel projects. Furthermore, the vertical length of the platens 14 can be scaled to accommodate any panel size. Methods useful to install the platens 14 so that all of their leading edges 16 are aligned may be found in the priority application No. 61/022,377.

Figure 5:
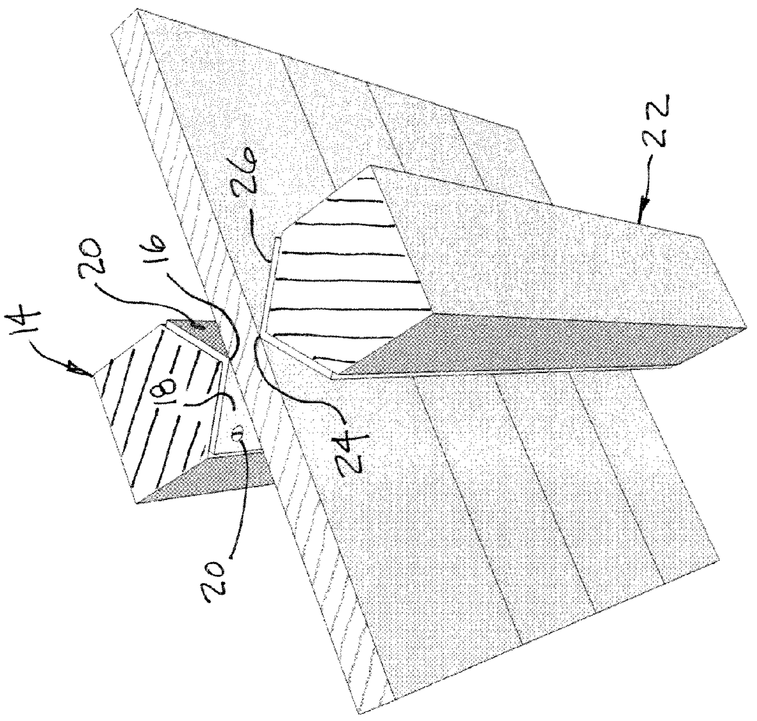
FIG. 5 is a fragmentary perspective view showing several wooden boards compressed in the nip region between a platen and press bar.

A press bar, generally indicated at 22, is associated with each platen 14. The press bars 22 may have a configuration and construction substantially identical to that of the platens 14, as depicted in FIG. 5. However, it is not necessary that the press bars 22 resemble the platens 14 in any way. Each press bar includes a generally vertical leading edge 24 which opposes the leading edge 16 of the associated platen 14 for creating an elongated compression nip region therebetween. In other words, the wooden boards 12 are compressed between the leading edges 16, 24 when pressure is applied by the press bar 22 in the direction of the platens 14. Although the leading edge 24 of the press bar 22 is shown as a 90° angle formed by a V-shaped cover 26 according to the platen 14 design, the leading edge 24 can be formed in other ways, including by a semi-cylindrical member, a flat surface, a U-shaped feature or some other configuration. The cover 26 can be metal (preferably aluminum), hard plastic, dense rubber, or the like. In the preferred embodiment, the leading edge 24 of the press bar 22 directly opposes the leading edge 16 of the platens 14 in an aligned manner to reduce torsional stress in the boards 12. However, in an alternative embodiment the leading edges 16, 24 may be laterally offset from one another.

The press bars 22 are arranged so as to be movable toward and away from their respective platens 14. At least one, but preferably two, press actuators 28 are operatively associated with each press bar 22 to incrementally forcibly advance the associated press bar 22 toward the opposing platen 14 so as to hold the wooden boards 12 flat against the leading edge 16 of the platen 14. When all of the press bars 22 in the assembly 10 are actuated in this manner, the wooden boards 12 are pressed against the aligned leading edges 16 of the platens 14, and there held firm while the glue cures. When the glue hardens, the boards 12 retain a permanent set condition that is equally co-planar with the leading edges 16.

Figure 4:
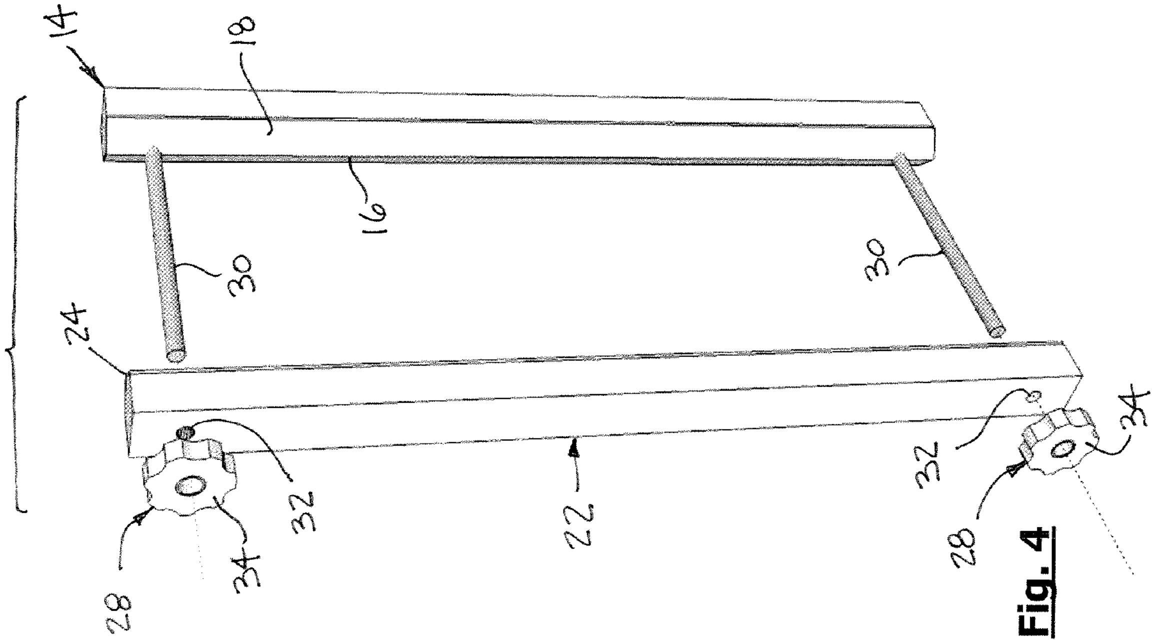
FIG. 4 is an exploded perspective view of a platen, press bar and two press actuators according to one embodiment of the invention.

In a first embodiment of this invention best illustrated in FIG. 4, the press actuator 28 is shown as an elongated screw shaft 30 extending horizontally from each platen 14 near its uppermost and lowermost ends. The cantilever screws 30 preferably intersect the leading edge 16 of each platen 14 (to reduce torsional stress) and are securely retained in position by any suitable method. One screw 30 anchoring technique is described in the priority application No. 61/022,377. The press bars 22 include upper and lower through holes 32 aligned with the cantilever screws 30. The through holes 32 intersect the leading edge 24 of the press bars 22. The press bars 22 are thus supported on their upper and lower cantilever screws 30. In this manner, two cantilever screws 30 provide guided movement of each press bar 22 toward and away from its platen 14. The leading edges 16, 24 are maintained in an aligned orientation as the press bars 22 advance and retreat from their associated platen 14. A threaded nut 34 is carried on the end of each cantilever screw 30. By hand-turning the nuts 34, each press bar 22 is advanced toward its respective platen 14 and thereby gently compress boards 12 in the nip between their leading edges 16, 24.

Figure 9:
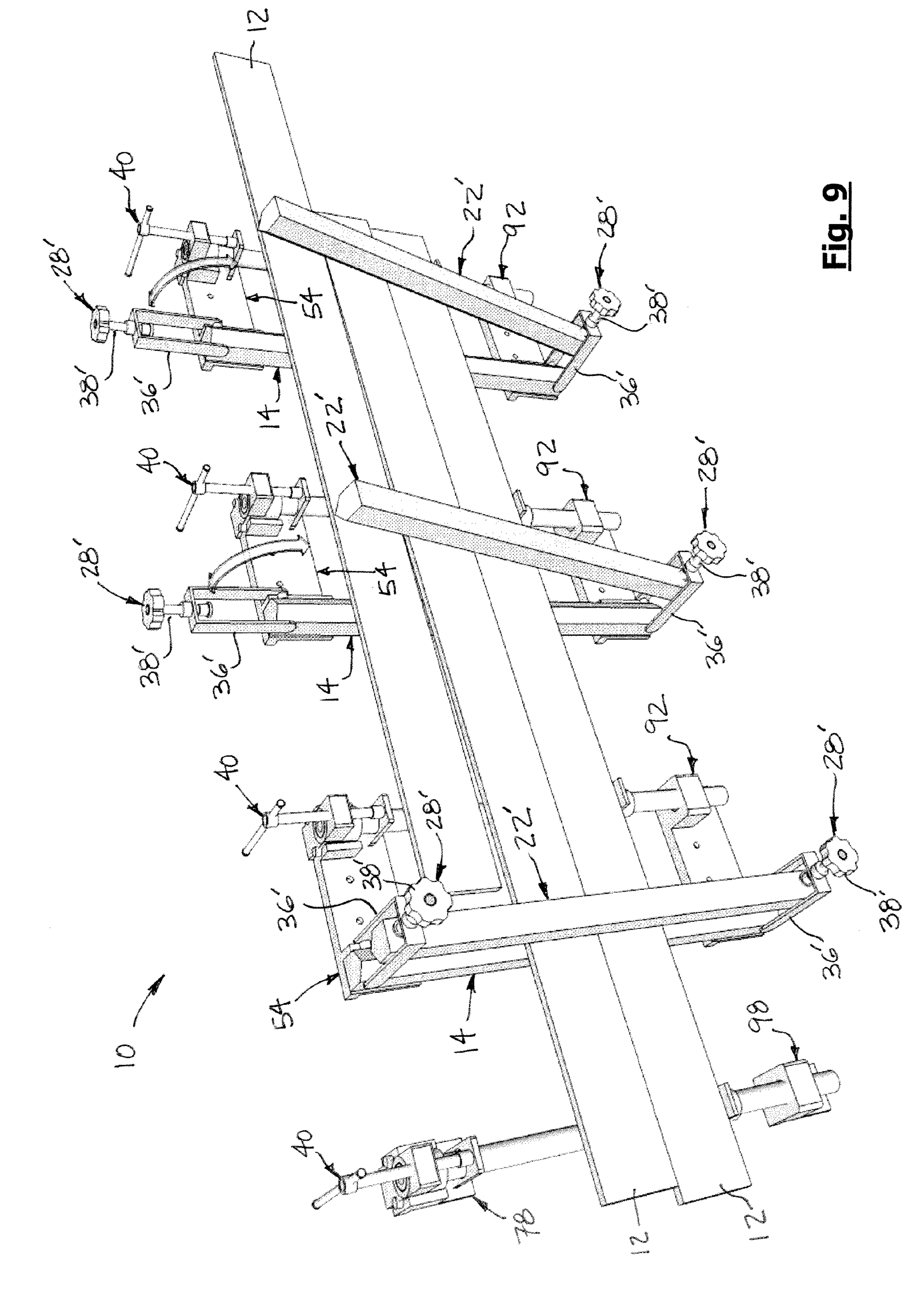
FIG. 9 is a perspective view of an alternative panel clamping assembly wherein the press bar actuators have been reconfigured to pivotally mount to respective platens for movement between use and non-use positions.

Those of skill in the art will readily appreciate many alternative configurations for the press actuator 28 which may include lever operated devices, cam actuated devices, hydraulics, pneumatics, wedges and other alternatives to a screw mechanism. All such variations are contemplated and fully within the scope of this invention. For example, FIG. 9 illustrates an alternative press actuator 28' that is pivotally mounted relative to each platen 14 so as to enable movement between a use position and a non-use position. In particular, the press actuator 28' as depicted in FIG. 9 includes a yoke 36' that is pivotally joined to the platen 14. A hand wheel activated screw 38' is threaded through a nut carried on the yoke 36' and manipulated to bear against the backside of each press bar 22' thereby compressing the boards 12 against the platens 14'. It is contemplated that by rotating the press actuators 28' to non-use positions as shown by the two rightmost assemblies in FIG. 9, the press bars 22' can be moved out of the way or removed completely to facilitate loading boards 12 and unloading finished panels. Of course, other press actuator designs are conceivable that are detachable or alternatively mounted so as to achieve similar results.

Clamping pressure applied to the wood boards 12 in the vertical direction, i.e., normal to their glued surfaces, is accomplished by conventional bar clamps such as those commercially available from numerous sources. Popular manufacturers of bar clamp devices include those marketed under the brands “Jorgensen” and “Pony” by The Adjustable Clamp Company of Chicago, Ill., those manufactured by Rockler of Medina, Minn., and those manufactured by Irwin Industrial Tools of Wilmington, Ohio. Of course, many other companies produce quality bar clamp assemblies, and those mentioned here by name are only a few of the commercially available models. It should be noted that the term bar clamp is used here in a broad sense. Included within the definition of bar clamps are I-beam clamps and the ubiquitous pipe clamp models illustrated throughout the drawing figures.

In FIGS. 1-3, four individual bar clamps, generally indicated at 40, are used in the panel clamping assembly 10. Preferably, the number of bar clamps 40 used in the assembly 10 is one more than the number of platens 14. Therefore, as the assembly 10 is scaled up for large panel projects, the number of platens 14 and bar clamps 40 can be increased as needed to maintain an ideal spacing between clamps 40 and platens 14. Spacings in the range of 6"-8" are considered ideal, but by no means exclusive.

The bar clamps 40 each have an elongated shaft 42 extending generally vertical between upper and lower 44 ends thereof. Although the shafts 42 are here illustrated as tubular and indicative of a common pipe clamp model, it is to be understood that the shaft 42 could be of the type having a rectangular or other geometric cross-sectional shape. A head stock 46 is affixed to the upper end of the shaft 42. In the case of pipe clamp type bar clamps 40, the head stock 46 is usually threaded to the shaft 42. In non-pipe clamp models, the head stock 46 is welded, pinned or otherwise secured to the shaft 42. The head stock 46 includes a threaded aperture through which a hand cranked screw 48 passes. Turning the hand screw 48 advances and retreats a pad 50 which may or may not be prevented from rotating by an integrated eyelet surrounding the shaft 42. The bar clamp 40 also includes a tail stock 52 slidably disposed along the shaft 42 between the lower end 44 and the head stock 46. The tail stock 52 usually includes an integrated pad that opposes the pad 50 of the head stock 46. The tail stock 52 may include a friction brake for locking it in any position on the shaft 42 to which it is moved, or alternatively may include a locking mechanism for engaging holes or detents at spaced intervals along the shaft 42. Indeed, other arrangements are known by which the tail stock 52 may be moved along the shaft 42 to a predetermined position and locked there for the clamping operation. With some reconfiguration, it is also possible to use a bar clamp whose head stock is movable along the shaft and its tail stock is fixed. Or, alternatively, where both head and tail stocks are movable along the shaft.

In the embodiment illustrated in FIGS. 1-3, the four bar clamps 40 are arranged generally equidistant from one another and spaced equally from each of the platens 14. This arrangement provides an even distribution of clamping pressure along the length of the boards 12. However, it is not necessary that the bar clamps 40 be arranged precisely equidistant from the platens 14. In FIG. 9, for example, the bar clamps 40 are shown unequally spaced between flanking platens 14'.

A clamp saddle, generally indicated at 54, is fixed relative to each platen 14 and configured to removably receive the head stock 46 of at least one bar clamp 40. It is possible to integrate two or more clamp saddles so that they will support multiple bar clamps 40. As perhaps best shown in FIG. 3, the clamp saddles 54 enable the bar clamps 40 to be removed from the assembly 10 so that they can be used in some other setting. In other words, the bar clamps 40 are not dedicated to use in the panel clamping assembly 10, but can be removed as needed and used for other operations. The clamps 40 may be returned again to the panel clamping assembly 10 for storage when not in use.

Figure 1A:
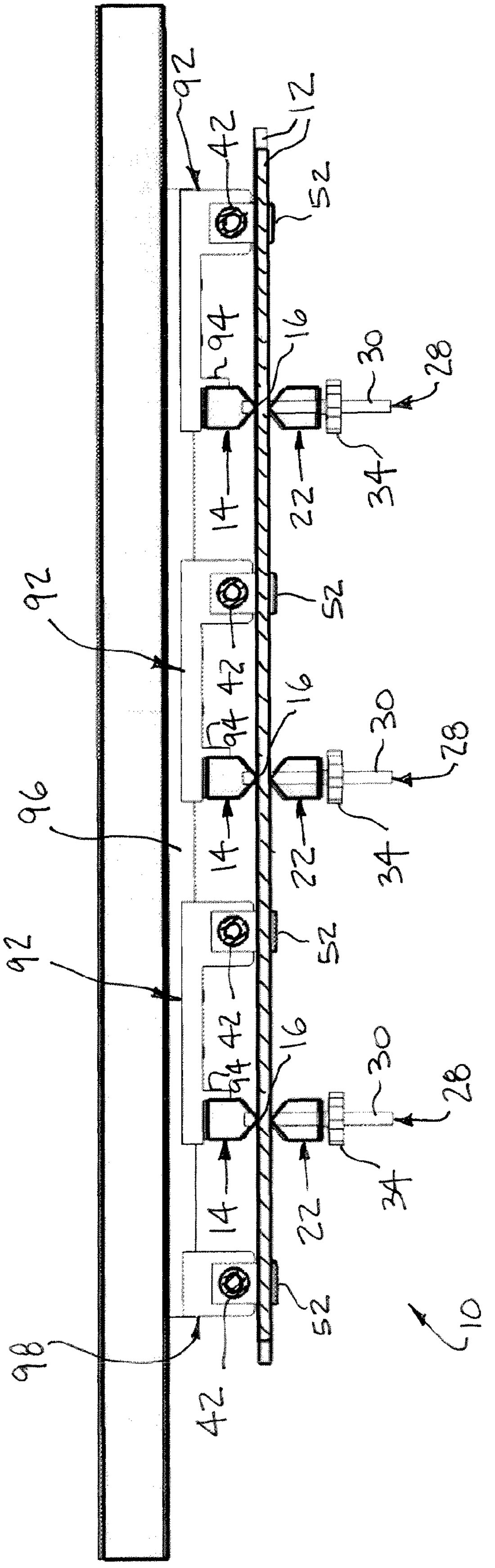
FIG. 1A is a cross-sectional view taken generally along lines 1A-1A in FIG. 1.
Figure 6:
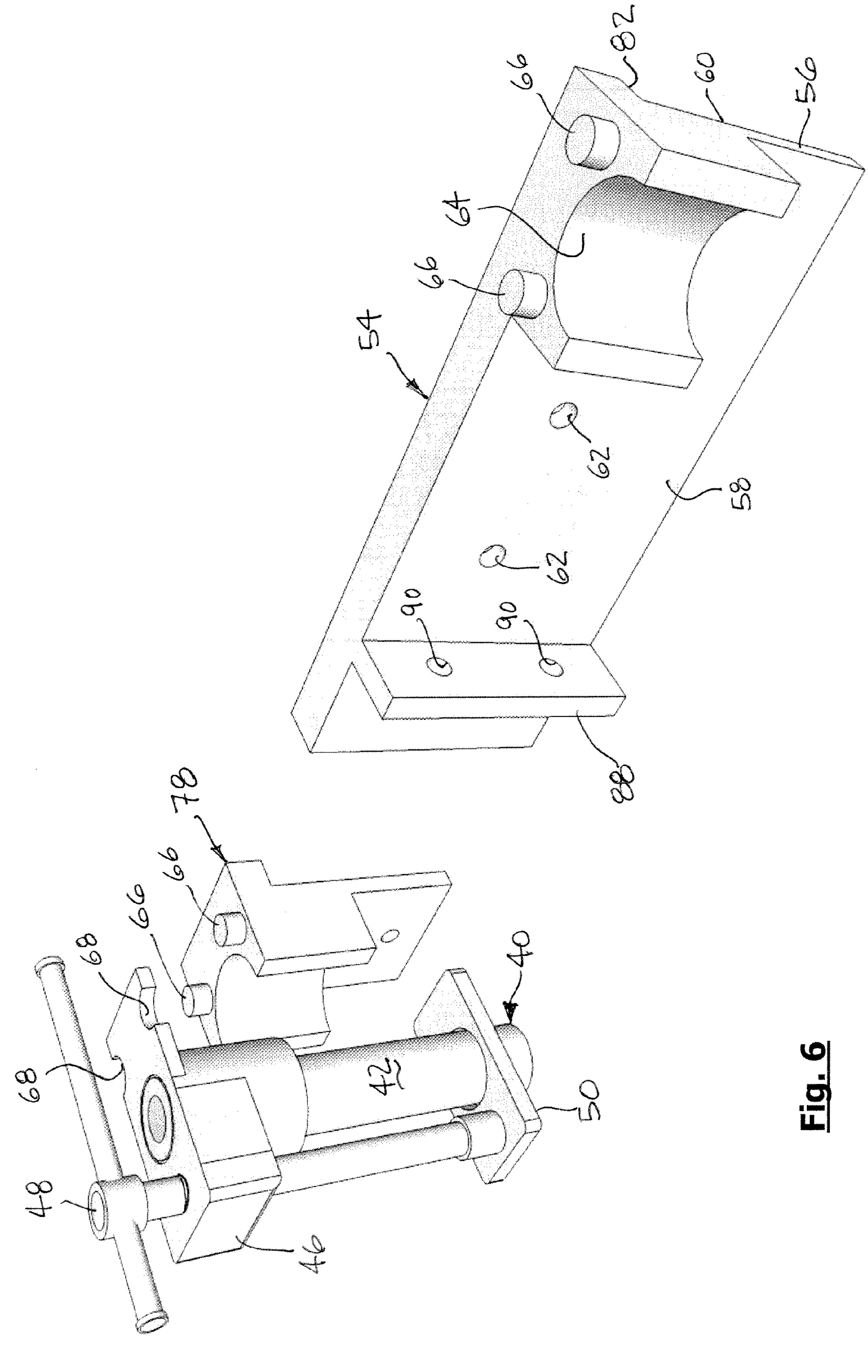
FIG. 6 is a perspective view of a clamp saddle, a half clamp saddle and the head stock of a conventional bar clamp adapted to be hung in the half clamp saddle.

Referring to FIG. 6, the clamp saddle 54 includes a backboard 56 having a front surface 58 and a back surface 60. A series of holes 62 pass through the backboard 56 for receiving screws (not shown) to fasten the clamp saddle 54 to a vertical supporting structure. A hook 64 extends from the front surface 58 of the backboard 56 and is configured to removably support the head stock 46 of an associated bar clamp 40. The hook 64 in this example comprises a semi-cylindrical, fork-like projection which may be specially adapted to accommodate a bar clamp 40 from one particular manufacturer, or may be made universal, or may include adaptors to accommodate various head stock sizes. The hook 64 is backset in relation to the leading edges 16 of the platens 14 so that there is a space between the bar clamp shafts 42 and the boards 12, as best shown in FIG. 1A. This backset space prevents contact between shafts 42 and glue which can cause staining of the wood and interfere with board 12 alignment. A half clamp saddle 78 is shown to the left of the clamp saddle 54 in FIGS. 1-3 and 6. The half clamp saddle 78 will be described in greater detail below in connection with FIG. 8.

At least one anti-rotation member 66 prevents rotation of a bar clamp 40 supported on the hook 64 while permitting guided vertical displacement of the bar clamp 40 relative to the backboard 56. The anti-rotation member 66 restrains the whole bar clamp 40 from twisting as its hand screw 48 is turned. Therefore, during a gluing operation when time is of the essence and frustration levels can run high, it is not necessary for the operator to prevent the bar clamp 40 from twisting in the clamp saddle 54 while simultaneously turning the hand screw 48. Rather, the anti-rotation member 66 locks the head stock 46 against rotation permitting one-handed turning of the hand screw 48 and greatly enhanced user convenience. The anti-rotation member 66 does not restrain vertical movement, however, allowing the bar clamp 40 to shift upward some distance during clamping. This is beneficial when the tail stocks 52 of all the bar clamps 40 are not set to exactly the same vertical displacement relative to their head stocks 46. In other words, if all of the tail stocks 52 of the various bar clamps 44 are not perfectly horizontally aligned with one another, some of the bar clamps 40 will rise out of their respective clamp saddle 54 when the clamp pad 50 is tightened against the boards 12. Thus, the anti-rotation member 66 accommodates a limited degree of upward movement of the bar clamp 40 while still preventing rotation of the bar clamp 40.

In FIG. 6, the anti-rotation member is shown as two cylindrical projections resting atop the hook 64. These cylindrical projections are adapted to mate with scallops 68 formed in the head stock 46 of the associated bar clamp. This configuration may be unique to head stocks 46 originating from a particular manufacturer. Therefore, other shapes and configurations of the anti-rotation member 66 may be designed to accommodate different shapes of head stocks 46.

Figure 7:
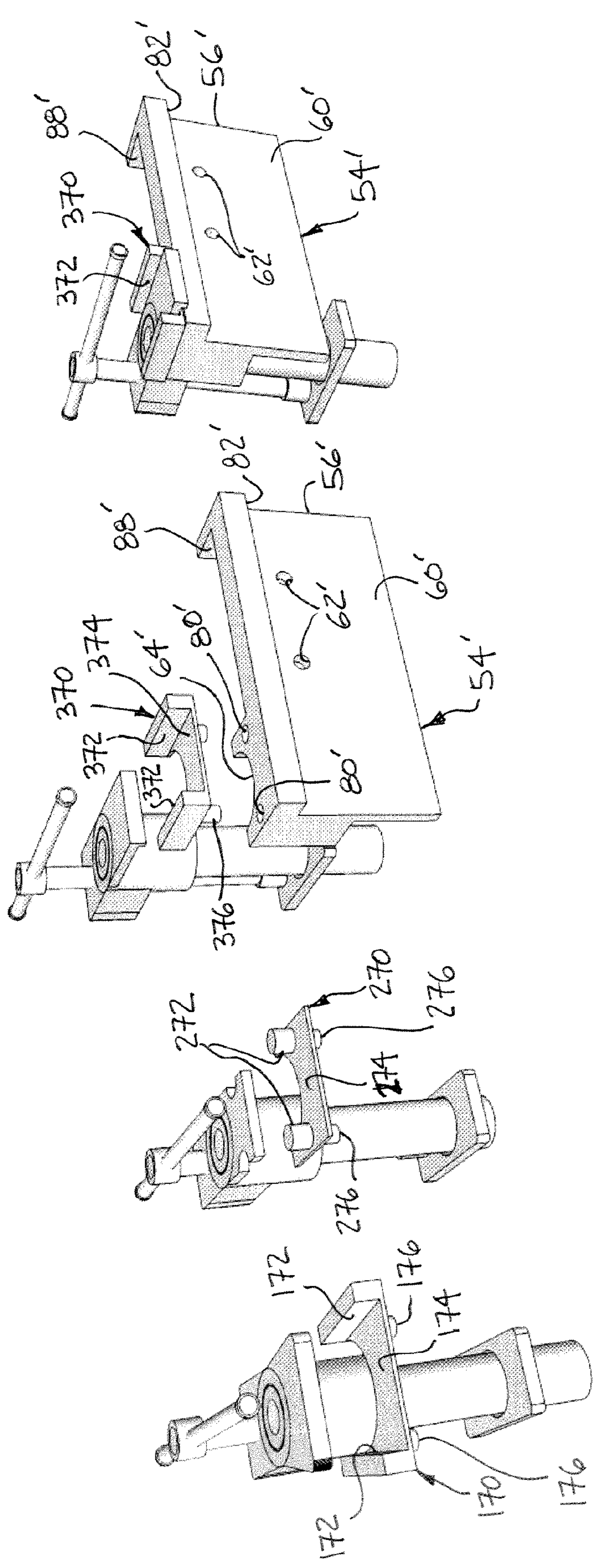
FIG. 7 is a perspective view of an alternative clamp saddle configuration wherein a plurality of separable auxiliary adapters are configured to receive the head stocks of bar clamp assemblies originating from various manufacturers and interchangeably attach to the clamp saddle.

FIG. 7 illustrates an alternative clamp saddle 54' adapted to receive a variety of auxiliary anti-rotation adapters. The anti-rotation member in this example is separable from the clamp saddle 54'. A first auxiliary anti-rotation adapter 170 includes a pair of diverging sidewalls 172 connected by a common plate 174. A pair of downwardly extending pins 176 are affixed under the plate 174 and are adapted to seat in receiving holes 80' formed in the top of the hook 64'. In this example, the diverging sidewalls 172 are adapted to receive a bar clamp 140 having a flaring head stock 146. Another auxiliary adapter 280 is shown for use with a bar clamp 240 from a different manufacturer having a unique head stock 246 shape. And still again, a third auxiliary adapter 370 is shown for yet another style head stock 346. These three examples are provided to represent all commercial production bar clamp designs. Corresponding features among the various adapter styles are noted with similar reference numbers distinguished by the prefix "1," "2," or "3." These examples show that it is possible to manufacture a plurality of auxiliary adapters designed to mount any conventional style of bar clamp.

Figure 8:
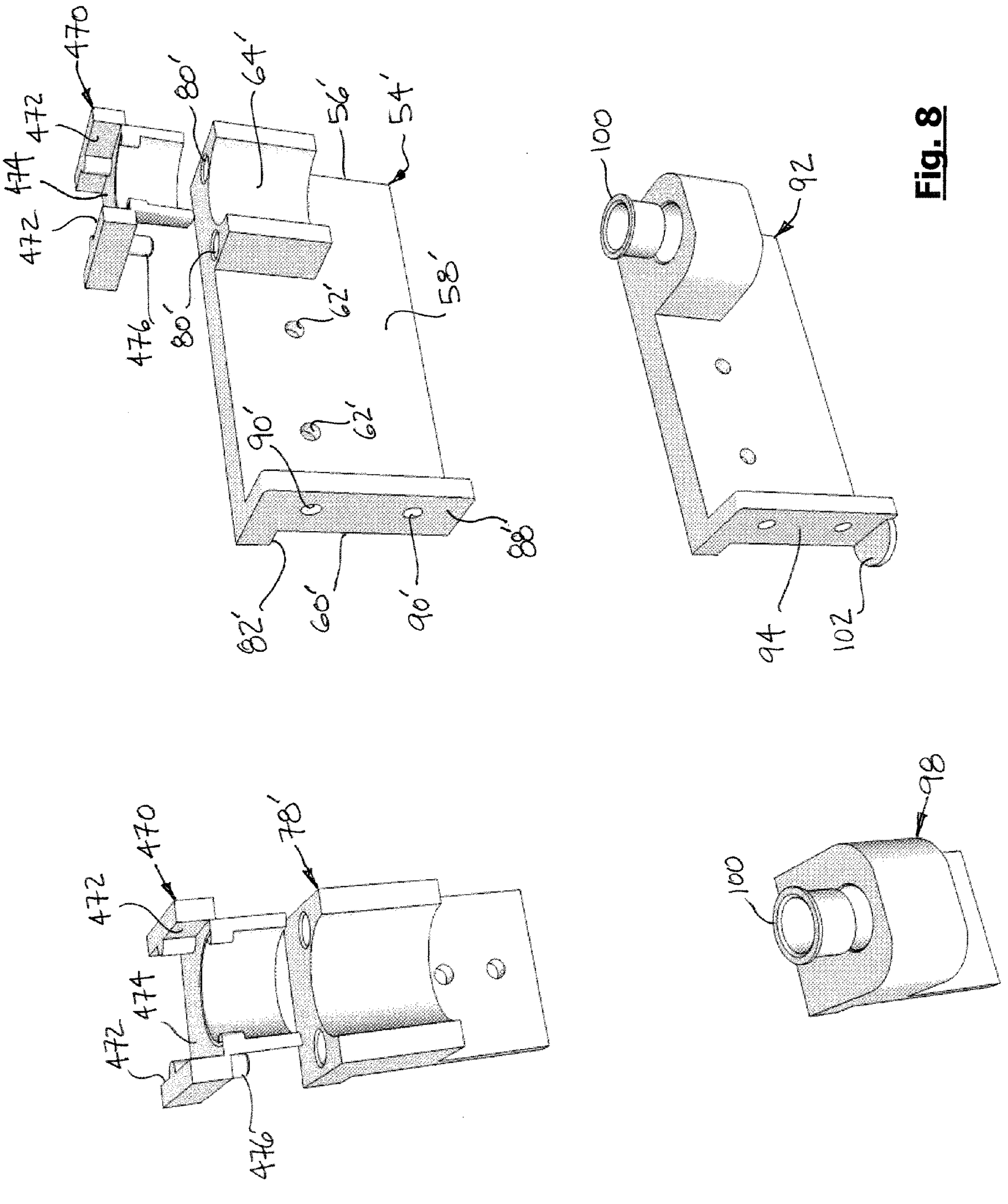
FIG. 8 is a perspective view of the clamp saddle of FIG. 7, together with a corresponding half clamp saddle, shaft guide and half shaft guide, wherein adapters are provided for accommodating different sized bar clamps.

FIG. 8 shows the alternative clamp saddle 54' with yet another auxiliary adapter 470. In this example, however, the auxiliary adapter 470 also resizes the interior pocket region of the hook 64' to fit a smaller sized or different shaped bar clamp (not shown). Also in this figure, a half clamp saddle 78' is shown receiving an identical adapter 470.

Returning again to FIG. 6, the clamp saddle 54 is shown including a lip 82 extending from the rear surface 60 of the backboard 56. The lip 82 is useful for locating the clamp saddle 54 along a prepared mounting ledge 84. The ledge 84 is perhaps best shown in FIGS. 1-3 as being formed in one example by an elongated mounting board 86 affixed horizontally to a wall or other support surface. The mounting board 86 can be easily fastened to a wall and leveled so as to provide a perfectly horizontal ledge 84. Then, each clamp saddle 54 is affixed to the mounting board 86. The lips 82 assure a common horizontal alignment, so that all of the upper clamp saddles 54 for each of the bar clamps 40 are at the same height and can be laterally spaced apart from one another in any desired interval, limited only by the length of the mounting board 86.

The clamp saddle 54 may also include at least one laterally offset platen mount 88 extending from the front surface 58 of the backboard 56. The platen mount 88 comprises a flange having through holes 90 formed for driving fasteners into an associated platen 14. The offset distance (laterally) between the platen mount 88 and the hook 64 can be designed so that an ideal spacing is automatically achieved between bar clamp 40 and adjacent platen 14, as shown in FIG. 1A and described above. Either side of the platen mount 88 can be used to attach the platen 14 so that an installer can choose between two optional clamp-to-platen offsets. Although this offset distance can vary, distances in the order of 6 to 8 inches between the center of the hook 64 and platen mount 88 will provide generally satisfactory results. Also, it will be understood that the platen mount 88 can be formed as a separate component from the clamp saddle 54, 54', and is shown as an integrated feature in the drawings as a preferred example only.

A shaft guide, generally indicated at 92, is disposed below each clamp saddle 54 and fixed relative thereto via attachment to a common wall, as shown throughout the illustrations. The shaft guides 92 support the lower end 44 of each bar clamp 40 while permitting guided vertical displacement. In other words, the shafts 42 of the bar clamps 40 freely slide up and down in their respective shaft guides 92 while their head stocks 46 are retained in the clamp saddles 54. In this manner, each bar clamp 40 is held in a substantially vertical orientation but is easily removed, as shown in FIG. 3, for use in other applications. The shaft guides 92 may be fabricated similar to the clamp saddles 54, including at least one laterally offset platen mount 94 for anchoring a lower end of a respective platen 14. Thus, the platen mounts 88, 94 are preferably vertically aligned with one another so that a platen 14 can be fixed in a vertical orientation. Likewise, the shaft guides 92 may include a rearwardly extending lip similar to that described above in connection with the clamp saddle 54 so that the shaft guides 92 can be mounted on a horizontal ledge provided by a lower mounting board 96.

FIG. 8 illustrates a half shaft guide 98 located directly below the half clamp saddle 78'. Both the half shaft guide 98 and half clamp saddle 78' are so-named because they do not include an integrated platen mount. In the various illustrations, the half clamp saddle 78, 78' and half shaft guide 98 are shown at the extreme left end of the clamp assembly 10. These half-devices enable an odd number of bar clamps 40 to be used with an even number of platens 14 so that clamping pressure can be applied to the extreme ends of boards 12. In FIG. 8, the shaft guide 92 and half shaft guide 98 are shown with an adapter bushing 100 that can be optionally inserted into the shaft receiving hole to reduce its diameter or change its shape. For example, if the shaft receiving holes are normally sized to accommodate ¾" black pipe, the adapter bushing 100 can be inserted so that ½" black pipe fits properly.

The shaft guide 92 in FIG. 8 is shown including an optional platen shelf 102 associated with the platen mount 94. The platen shelf 102 temporarily supports a platen 14 during installation of the assembly 10, i.e., before fasteners are driven through the holes 90 in the platen mounts 88, 94. Further description of platen 14 installation will be better understood by reference to the priority application No. 61/022,377.

The invention has been described in accordance with the relevant legal standards, thus the foregoing description is exemplary rather than limiting in nature. Variations and modifications to the disclosed embodiments may become apparent to those skilled in the art and will fall within the scope of the invention. The subject clamp assembly 10 can be used to guarantee flat assembly of doors, frames and other such components in addition to making panels from wood boards 12. Furthermore, the clamp assembly 10 can be scaled up or down to suit the application, with platen 14 and bar clamp 40 units added or removed as needed to maintain adequate spacings. Accordingly the scope of legal protection afforded this invention can only be determined by studying the following claims.

What is claimed is:

1. A panel clamping assembly of the type for edge-gluing wooden boards and the like, said assembly comprising:

at least one pair of platens spaced apart from one another and each having a leading edge, said leading edges of said platens lying in a common plane;

a press bar associated with each of said platens and independently movable toward and away therefrom, and each said press bar including a leading edge generally parallel to and opposing said leading edge of said associated platen for creating an elongated compression nip region therebetween;

a bar clamp disposed alongside said pair of platens, said bar clamp having an elongated shaft extending between upper and lower ends thereof, a head stock affixed to said upper end of said shaft, and a tail stock slideably disposed along said shaft between said lower end and said head stock;

and a clamp saddle fixed relative to said pair of platens and configured to removeably receive said head stock of said bar clamp.

2. The assembly of claim 1, wherein said clamp saddle includes at least one anti-rotation member for preventing rotation of said bar clamp while permitting guided linear displacement of said bar clamp relative to said clamp saddle.

3. The assembly of claim 1, wherein said anti-rotation member is separable from said clamp saddle.

4. The assembly of claim 1, further including a shaft guide disposed below said clamp saddle and fixed relative thereto for slideably supporting said lower end of said shaft.

5. The assembly of claim 4, wherein said shaft guide includes at least one laterally offset platen mount for anchoring a lower end of one of said platens.

6. The assembly of claim 4, wherein said shaft guide includes a lip for locating said shaft guide on a ledge.

7. The assembly of claim 4, wherein said shaft guide includes a platen shelf associated with said platen mount.

8. The assembly of claim 1, wherein said clamp saddle includes at least one laterally offset platen mount for anchoring an upper end of one of said platens.

9. The assembly of claim 1, wherein said clamp saddle includes a lip for locating said clamp saddle on a ledge.

10. The assembly of claim 1, further including a press actuator operatively associated with each of said press bars for incrementally forcibly advancing said press bar toward said opposing platen to hold wooden boards flat against said leading edge of said platen.

11. The assembly of claim 10, wherein said press actuator includes at least one threaded screw extending between said associated press bar and said opposing platen, and a threaded nut operatively engaging said screw.

12. The assembly of claim 10, wherein said press actuator is movably mounted relative to said opposing platen for movement between use and non-use positions.

13. The assembly of claim 1, wherein said leading edge of at least one of said press bar and said platen is formed by a generally V-shaped cover.

14. A panel clamping assembly of the type for edge-gluing wooden boards and the like, said assembly comprising:

at least one pair of platens spaced apart from one another and each having a generally vertically extending leading edge, said leading edges of said platens lying in a common vertical plane;

at least two press bars, each said press bar associated with a respective one of said platens and moveable toward and away therefrom, and each of said press bars including a generally vertical leading edge opposing said leading edge of said associated platen for creating an elongated compression nip region therebetween;

a press actuator operatively associated with each of said press bars for incrementally forcibly advancing said press bar toward said opposing platen to hold wooden boards flat against leading edge of said platen;

a bar clamp disposed generally mid-way between said pair of platens, said bar clamp having an elongated shaft extending generally vertically between upper and lower ends thereof, a head stock affixed to said upper end of said shaft, and a tail stock slideably disposed along said shaft between said lower end and said head stock;

a clamp saddle fixed relative to said pair of platens and configured to removeably receive said head stock of said bar clamp, said clamp saddle including at least one anti-rotation member for preventing rotation of said bar clamp while permitting guided vertical displacement of said bar clamp relative to said clamp saddle;

and a shaft guide disposed directly below said clamp saddle and fixed relative thereto for slideably supporting said lower end of said shaft while permitting guided vertical displacement of said bar clamp.

15. The assembly of claim 14, wherein said anti-rotation member is separable from said clamp saddle.

16. The assembly of claim 15, further including an auxiliary anti-rotation adapter.

17. The assembly of claim 14, wherein said clamp saddle includes at least one laterally offset platen mount for anchoring an upper end of one of said platens, and wherein said shaft guide includes at least one laterally offset platen mount vertically aligned with said platen mount of said clamp saddle.

18. The assembly of claim 14, wherein said clamp saddle includes a locating lip, and wherein said shaft guide includes a locating lip.

19. The assembly of claim 14, wherein said leading edge of at least one of said platen and said press bar is formed by a generally V-shaped cover.

* * * * *